United States Patent
Schwegle et al.

(10) Patent No.: US 6,793,954 B2
(45) Date of Patent: Sep. 21, 2004

(54) AQUEOUS COMPOSITIONS USEFUL FOR STABILIZING AND TEXTURIZING DAIRY PRODUCTS AND PROCESS FOR PREPARING THE SAME

(75) Inventors: Thomas Schwegle, Pfaffenhausen (DE); Klaus Sanladerer, München (DE)

(73) Assignee: Kraft Foods R&D, Inc., Munich (DE)

( * ) Notice: Subject to any disclaimer, the term of this patent is extended or adjusted under 35 U.S.C. 154(b) by 0 days.

(21) Appl. No.: 09/843,390

(22) Filed: Apr. 25, 2001

(65) Prior Publication Data
US 2002/0061357 A1 May 23, 2002

(30) Foreign Application Priority Data
Apr. 28, 2000 (EP) .............................. 00109232

(51) Int. Cl.⁷ ................................................ A23C 9/00
(52) U.S. Cl. ....................... 426/580; 426/573; 426/582; 426/583; 426/654; 426/657
(58) Field of Search ................................ 426/580, 582, 426/583, 654, 656, 657, 658, 573, 575, 578

(56) References Cited

U.S. PATENT DOCUMENTS

| 4,568,555 A | 2/1986 | Spanier | 426/582 |
|---|---|---|---|
| 5,104,674 A | 4/1992 | Chen et al. | 426/573 |
| 5,215,777 A | 6/1993 | Asher et al. | 426/565 |
| 5,252,352 A | 10/1993 | Banach et al. | 426/580 |
| 5,589,215 A | * 12/1996 | Tang | 426/549 |
| 5,614,243 A | * 3/1997 | Dunn et al. | 426/578 |
| 5,904,944 A | 5/1999 | Battermann et al. | 426/281 |

FOREIGN PATENT DOCUMENTS

| EP | 0 750 843 A2 | 1/1997 | A23C/20/00 |
|---|---|---|---|
| WO | WO 93/21784 A1 | 11/1993 | A23L/1/308 |
| WO | 99/57996 | * 11/1999 | |

OTHER PUBLICATIONS

Lupano, C., "Gelation of Whey Protein Concentrate—Cassava Starch in Acidic Conditions," *J. Agric. Food Chem.*, 47:3, pp. 918–923.

European Search Report, for European Patent Application No. 00109232.9–2114, 2 pages; Annex to the European Search Report, 2 pages; and cover sheet, dated Nov. 15, 2000.

* cited by examiner

*Primary Examiner*—Leslie Wong
(74) *Attorney, Agent, or Firm*—Fitch, Even, Tabin & Flannery

(57) ABSTRACT

The present invention relates to a process for preparing an aqueous composition useful as a stabilizing and texturizing agent in dairy products, the composition obtainable by said process and a food composition comprising a dairy product base and said aqueous composition.

7 Claims, No Drawings

AQUEOUS COMPOSITIONS USEFUL FOR STABILIZING AND TEXTURIZING DAIRY PRODUCTS AND PROCESS FOR PREPARING THE SAME

BACKGROUND OF THE INVENTION

1. Field of the Invention

The present invention relates to a process for preparing an aqueous composition useful as a stabilizing and texturizing agent in dairy products, the composition obtainable by said process and a food composition comprising a dairy product base and the aqueous composition.

2. Description of the Related Art

In food industry, many dairy products such as soft white cheese are processed by heat-treatment, homogenization and hot-filling in order to obtain the packaged dairy product. If the heat-treatment or hot-filling of the dairy product is carried out at temperatures of higher than 60° C., textural quality defects, such as a grainy, sandy or mealy mouth-feel, may result due to uncontrolled protein agglomeration. This is a particular problem of low fat/high protein dairy products containing less than 10% fat due to a decreased stabilizing effect of the fat component. Although dairy products may be packaged in a cold-fill process avoiding elevated temperatures, such cold-filling requires the use of an aseptic processing system.

It is known to use stabilizing compositions containing hydrocolloids and starch in order to avoid syneresis in a dairy product, as described in WO 9957996, U.S. Pat. No. 5,614,243 and EP 289096. However, there is still demand for a further improvement of such compositions, in particular to be used in processing at elevated temperatures.

DETAILED DESCRIPTION OF THE PREFERRED EMBODIMENTS

Therefore, it is an object of the present invention to provide a means for reducing or completely preventing uncontrolled protein agglomeration in protein-containing dairy products during heat-treatment or hot-filling, so that a dairy product can be produced combining the advantages of a hot-fill process (shelf-life extension by 1 to 3 months) and a cold-fill process (high quality product texture) without being forced to use an aseptic processing system.

This object is solved in the present invention by providing an aqueous composition comprising whey protein concentrate (WPC), starch, a first hydrocolloid, and a second hydrocolloid, wherein the aqueous composition has been heated to a temperature in the range of 60–100° C. for a period (holding time) of 1 to 120 minutes.

Thus, in one aspect the present invention provides a process for preparing an aqueous composition, which process comprises heating an aqueous mixture comprising 1.5 to 45 percent by weight (wt. %) of whey protein concentrate (WPC), calculated as WPC dry solids, 1 to 15 wt. % of starch, 0.15 to 6 wt. % of a first hydrocolloid, and 0.03 to 3 wt. % of a second hydrocolloid to a temperature in the range of 60 to 100° C. for a period of 1 to 120 minutes.

Preferably, the aqueous composition comprises 3 to 30 wt. % of WPC, more preferably 5 to 25 wt. % and most preferably 10 to 20 wt. %. The whey protein concentrate may be any conventional product, and it may be in the form of a liquid solution, dispersion or dried powder. In case the whey protein concentrate is used in liquid form, its content in the aqueous composition is calculated on the basis of the dry WPC matter. Furthermore, if it is in liquid (aqueous) form, the aqueous content of the WPC may constitute all or part of the aqueous phase of the stabilizing composition.

The aqueous composition preferably comprises 1.5 to 10 wt. % of starch, more preferably 2.5 to 6 wt. %. Any starch or combinations thereof may be used. Examples for suitable types of starch are waxy maize, corn, pea, wheat and potato.

The aqueous composition comprises a first hydrocolloid in an amount of 0.15 to 6 wt. %, preferably 0.3 to 3 wt. % and more preferably 1 to 2.5 wt. %. As the first hydrocolloid, a gum is preferably used. Any gum conventionally used in the field of food industry may be used, and the gum is preferably selected from one or more of carob bean gum (locust bean gum), guar gum, gum arabic, xanthan gum and tara bean gum. More preferably, the gum is carob bean gum.

The aqueous composition comprises a second hydrocolloid in an amount of 0.03 to 3 wt. %, preferably 0.06 to 2.5 wt. %, more preferably 0.15 to 1.5 wt. % and most preferably 0.3 to 1 wt. %. As the second hydrocolloid, a gel-forming heteropolysaccharide is preferably used. Any gel-forming heteropolysaccharide conventionally used in the field of food industry may be used, and preferred examples are carrageenan and agar, more preferably carrageenan. A combination of one or more gel-forming heteropolysaccharides may be used.

In one particularly preferred embodiment, carob bean gum and carrageenan are used as the first and second hydrocolloid, respectively.

The aqueous composition comprises water in at least an amount necessary to provide a slurry of the components mentioned above. Water constitutes the remainder of the aqueous composition of the invention needed to accomplish 100 wt. %. It is also possible to include additional components in the aqueous composition, such as texturizing and stabilizing components conventionally used in food industry. In this case, water also makes up the remainder of the aqueous composition needed to accomplish 100 wt. %.

In the process for preparing the aqueous composition of the present invention, a mixture comprising the components above and water is heated to a temperature in the range of 60 to 100° C. for a period (holding time) of 1 to 120 minutes. Preferably, the heat-treatment is carried out at a temperature in the range of 70 to 95° C., more preferably 80 to 90° C. The duration of the heat-treatment is preferably 3 to 60 minutes, more preferably 5 to 30 minutes. The heat-treatment may be carried out under atmospheric pressure or increased pressure.

The aqueous composition obtainable by the process of the present invention is useful as a stabilizing and/or texturizing agent dairy products. When used in such products, the aqueous composition can prevent uncontrolled protein agglomeration and, therefore, textural quality defects such as a grainy, sandy and/or mealy mouth-feel. In particular, this effect is more prominent in a high protein dairy product. In this specification, the term "high protein" means a ratio of protein to fat of more than 1. Preferably, the dairy product is also a low fat dairy product. In this specification, the term "low fat" means a fat content of less than 10 wt. % fat, based on the final product. Examples for dairy products wherein the aqueous composition in the present invention may be preferably used are yogurt, sour milk, cream cheese and soft white cheese.

In another aspect, the present invention provides a food composition comprising a dairy product base and the aqueous composition of the present invention. In the food composition of the present invention, the dairy product base is present in an amount of 30 to 80 wt. % and the aqueous composition is present in an amount of 70 to 20 wt. %, each based on the final food composition. Preferably, the content of dairy product base and aqueous composition in the food composition is 45 to 75 wt. % and 55 to 25 wt. %, respectively, more preferably 60 to 70 wt. % and 40 to 30 wt. %, respectively.

Thus, the resulting food composition effectively comprises, in a preferred embodiment, 0.5 to 15 wt. % of WPC (calculated as dry matter), 0.3 to 5 wt. % of starch, 0.05 to 2 wt. % of the first hydrocolloid and 0.01 to 1 wt. % of the second hydrocolloid. More preferably, the food composition comprises 1 to 10 wt. % of WPC, 0.5 to 3 wt. % of starch, 0.1 to 1.0 wt. % of the first hydrocolloid and 0.02 to 0.8 wt. % of the second hydrocolloid. Even more preferably, the resulting food composition comprises 2 to 8 wt. % of WPC, 0.8 to 2 wt. % of starch, 0.3 to 0.8 wt. % of the first hydrocolloid and 0.05 to 0.5 wt. % of the second hydrocolloid.

Preferred dairy product bases to be used in the food composition according to the invention are bases for yogurt, sour milk, cream cheese and soft white cheese. In one preferred embodiment of the invention, a low fat and/or high protein dairy product base is used. It is possible to use one or more dairy product bases in order to obtain desirable characteristics of the final dairy product. It is particularly preferred to use one or more soft white cheese bases for obtaining soft white cheese, and more preferably to use one or more low fat/thigh protein soft white cheese bases. In the latter case, a desirable dairy product having a low fat content and high protein content while still providing excellent textural quality (mouth-feel) may be obtained.

The prepared aqueous composition can be blended either batch wise or inline (continuously) into the protein-containing dairy product base prior to final processing, e.g. heat-treatment, homogenization and hot-filling.

The resulting food composition exhibits improved texture and, therefore, mouth-feel, as no uncontrolled or undesired protein agglomeration occurs during processing, e.g. heat-treatment or hot-filling. This effect is particularly prominent with low fat/high protein products such as low fat/high protein soft white cheese which is conventionally subjected to a heat-treatment for sterilization and packaged by hot-filled requiring a temperature of more than 60° C. The hot-fill process results in a shelf-life extension, usually by 1 to 3 months, without being forced to use an aseptic processing system. Furthermore, when using the aqueous composition of the present invention in a dairy product, a similar or even improved product quality, e.g. smooth product texture, as compared to a cold-fill processing can be accomplished.

EXAMPLE

An aqueous composition was prepared by mixing together dried whey protein concentrate, starch, carob bean gum, carrageenan and water as set forth in the following table:

| Component | Percent by weight (in aqueous composition) | Percent by weight (in food composition) |
|---|---|---|
| WPC (dry) | 14.6 | 4.8 |
| Starch | 6.1 | 2.0 |
| Carob bean gum | 2.1 | 0.7 |
| Carrageenan | 1.2 | 0.4 |
| Water | 76 | 25.0 (from aqueous composition only) |

The mixture was heated to a temperature of 95° C. for a holding time of 15 minutes. Upon cooling, the aqueous composition was blended with low fat/high protein soft white cheese base in an amount of 67 wt. % cheese base and 33 wt. % aqueous composition, based on the resulting blend. The blend was heat-treated at 55° C. for 2 minutes, homogenized and hot-filled at a temperature of 55° C. The resulting low fat/high protein soft white cheese exhibited a pleasant mouth-feel with no textural quality defects and no occurrence of syneresis.

What is claimed is:

1. A process for preparing an aqueous composition comprising heating an aqueous mixture to a temperature in the range of about 60 to about 100° C. for a period of about 1 to about 120 minutes, the aqueous mixture comprising about 1.5 to about 45 weight percent whey protein concentrate, calculated as dried product, about 1 to about 15 weight percent starch, about 0.15 to about 6 weight percent of a first hydrocolloid, and about 0.03 to about 3 weight percent of a second hydrocolloid.

2. The process according to claim 1, wherein the whey protein concentrate is in liquid or powder form.

3. The process according to claim 1, wherein the starch is selected from the group consisting of waxy maize starch, corn starch, pea starch, wheat starch and potato starch, or combinations thereof.

4. The process according to claim 1, wherein the first hydrocolloid comprises one or more gums and the second hydrocolloid comprises one or more gel-forming heteropolysaccharides.

5. The process according to claim 4, wherein the gum is selected from the group consisting of carob bean gum, guar gum, gum arabic, xanthan gum and tara bean gum, or combinations thereof.

6. The process according to claim 4, wherein the gel-forming heteropolysaccharide further comprises carrageenan or agar, or combinations thereof.

7. The process according to claim 4, wherein the process is carried out under pressure.

* * * * *